US007881267B2

(12) United States Patent
Crosswy et al.

(10) Patent No.: US 7,881,267 B2
(45) Date of Patent: Feb. 1, 2011

(54) PORTABLE COMPUTING DEVICE FOR WIRELESS COMMUNICATIONS AND METHOD OF OPERATION

(75) Inventors: William C. Crosswy, The Woodlands, TX (US); Matthew J. Wagner, Houston, TX (US); Robin Castell, Spring, TX (US); Craig Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1825 days.

(21) Appl. No.: 10/861,846

(22) Filed: Jun. 4, 2004

(65) Prior Publication Data
US 2005/0286476 A1 Dec. 29, 2005

(51) Int. Cl.
*H04Q 7/24* (2006.01)
(52) U.S. Cl. ...................................... 370/338
(58) Field of Classification Search ................. 370/329, 370/338, 347; 455/552.1
See application file for complete search history.

(56) References Cited

U.S. PATENT DOCUMENTS

| | | | | |
|---|---|---|---|---|
| 6,147,986 | A * | 11/2000 | Orsic | 370/349 |
| 6,684,157 | B2 * | 1/2004 | Barman et al. | 701/213 |
| 6,954,616 | B2 * | 10/2005 | Liang et al. | 455/63.1 |
| 7,039,027 | B2 * | 5/2006 | Bridgelall | 370/329 |
| 7,149,197 | B2 * | 12/2006 | Garahi et al. | 370/328 |
| 7,155,247 | B2 * | 12/2006 | Busch | 455/513 |
| 7,206,294 | B2 * | 4/2007 | Garahi et al. | 370/315 |
| 7,236,777 | B2 * | 6/2007 | Tolhurst | 455/422.1 |
| 7,327,705 | B2 * | 2/2008 | Fletcher et al. | 370/331 |
| 7,453,844 | B1 * | 11/2008 | Lee et al. | 370/329 |
| 2002/0085516 | A1 * | 7/2002 | Bridgelall | 370/329 |
| 2004/0125812 | A1 | 7/2004 | Kao | |
| 2004/0179512 | A1 | 9/2004 | Leblanc | |
| 2004/0184466 | A1 | 9/2004 | Chang | |
| 2004/0202120 | A1 * | 10/2004 | Hanson | 370/328 |
| 2004/0209632 | A1 * | 10/2004 | Link et al. | 455/466 |
| 2005/0074019 | A1 * | 4/2005 | Handforth et al. | 370/406 |
| 2005/0076054 | A1 * | 4/2005 | Moon et al. | 707/103 Y |
| 2005/0181779 | A1 * | 8/2005 | Jones et al. | 455/421 |
| 2005/0238046 | A1 * | 10/2005 | Hassan et al. | 370/465 |
| 2007/0091845 | A1 * | 4/2007 | Brideglall | 370/331 |
| 2007/0115950 | A1 * | 5/2007 | Karaoguz et al. | 370/356 |

(Continued)

FOREIGN PATENT DOCUMENTS

CA 2 491 440 1/2004

(Continued)

OTHER PUBLICATIONS

Yujin Lim, et al., "Performance Evaluation of the Bluetooth-based Public Internet Access Point," IEEE, 2001, pp. 643-648.

(Continued)

*Primary Examiner*—Ayaz R Sheikh
*Assistant Examiner*—Blanche Wong

(57) ABSTRACT

In one embodiment of the present invention, a portable computing device for wireless communications comprises a first network interface for communicating with a public wireless wide area network (WWAN), a second network interface for communicating with a private wireless local area network (WLAN), and a processor executing under control of software instructions, the software instructions defining a gateway protocol, the gateway protocol establishing the portable computing device as an access point within the private WLAN after the wireless presence on the public WWAN is established.

20 Claims, 3 Drawing Sheets

FOREIGN PATENT DOCUMENTS

| | | |
|---|---|---|
| DE | 101 52 855 A1 | 5/2003 |
| DE | 203 10 166 U1 | 11/2003 |
| DE | 102 33 606 A1 | 2/2004 |
| WO | WO 01/76154 A2 | 10/2001 |
| WO | WO03/101025 | 5/2003 |
| WO | WO2004/070970 | 6/2003 |
| WO | WO 2004/034219 | 4/2004 |

OTHER PUBLICATIONS

Daniel L. Lough, et al., "A Short Tutorial on Wireless LANs and IEEE 802.11," IEEE,, Internet: http://www.computer.org/students/looking/summer97/ieee802.htm, Oct. 3, 2003, pp. 1-5.

Nokia, "Bluetooth Technology Overview," Version 1.0, Apr. 4, 2003, internet: Forum.Nokia.com, pp. 1-24.

Nokia Connecting People, Nokia.com, "Bluetooth," internet: http://www.nokia.com/nokia/0,,397,00.html, Apr. 1, 2004, p. 1.

German Office Action dated Jul. 17, 2007, German Application No. 10 2005 021 315.4-31, 5 pp.

Japanese Office Action dated Nov. 2, 2007, Japanese Application No. 2005-147532. 2 pp.

UK Intellectual Property Office, Examination Report under Section 18(3), dated Jul. 24, 2008, pp. 3.

* cited by examiner

PORTABLE COMPUTING DEVICE FOR WIRELESS COMMUNICATIONS AND METHOD OF OPERATION

FIELD OF THE INVENTION

The present invention is directed to wireless communications.

DESCRIPTION OF RELATED ART

A number of wireless communication protocols enable mobile or portable computing devices to conduct network communications. For example, wireless fidelity ("Wi-Fi") products enable wireless communication, often referred to as wireless local area networks (WLAN), using the IEEE 802.11b protocol. The 802.11b protocol defines the physical and medium access control layers of the communication protocol. The physical layer refers to characteristics associated with the wireless transmission of data (i.e., using direct spread spectrum processing, frequency hopping, or infrared (IR) pulse modulation for the 802.11b standard). The medium access control layer refers to the techniques that maintain order within the shared communication medium to prevent networked devices from interfering with each other's communications.

According to the 802.11b communication protocol, two types of wireless communication networks are possible. In the first type, an "ad-hoc" wireless communication network is formed. Specifically, when a number of wireless-capable devices are within communication range, the wireless communication devices "elect" one of the devices as the base station and the other devices act as slaves to the base station. The base station manages the communication within the wireless network. In the second type, an infrastructure model is employed wherein at least one access point is employed. An access point is a fixed wireless capable device that is also coupled to a wired network. The wired network may enable communication with other resources such as file servers, printers, and/or the like or may enable communication through other larger networks such as the Internet.

Another wireless communication protocol is the general packet radio service (GPRS) protocol. Communication using the GPRS protocol occurs through public wireless cellular systems (e.g., global system for mobile (GSM) communications networks) to provide wireless wide area networks (WWAN). A device that attempts to communicate using the GPRS protocol establishes its presence within a cell of an appropriate network by registering with the network through a base station. The base station is coupled to the cellular infrastructure and routes packets to and from the wireless device.

The foregoing WLANs and WWANs provide various different features and advantages. For example, WLAN interfaces are often relatively inexpensive and use low power, facilitating their implementation in a wide variety of devices, including handheld computers, portable computers, printers, dedicated-purpose devices, etcetera. WWAN interfaces provide extended range communication links, such as throughout a metropolitan area, facilitating access to a large number of resources and information. Such resources and information are unavailable to users of a WLAN without the use of one of the aforementioned fixed access points employing a wired network connection.

SUMMARY

In one embodiment of the present invention, a portable computing device for wireless communications comprises a first network interface for communicating with a public wireless wide area network (WWAN), a second network interface for communicating with a private wireless local area network (WLAN), and a processor executing under control of software instructions, the software instructions defining a gateway protocol, the gateway protocol establishing the portable computing device as an access point within the private WLAN after the wireless presence on the public WWAN is established.

In another embodiment of the present invention, a method for wireless communications comprises detecting entry into a service area of a public wireless wide area network (WWAN) by a portable computing device, and establishing a private wireless local area network (WLAN) by the portable computing device, wherein the portable computing device performs at least one access point service for said private WLAN.

In another embodiment of the present invention, a system for wireless communications comprises means for registering with a public wireless wide area network (WWAN) to transmit and receive communication packets after detection of entry into a service area of the public WWAN and means for establishing access point services for a private wireless local area network (WLAN), wherein the means for establishing operates in response to the means for registering.

DETAILED DESCRIPTION

Figure 1A:
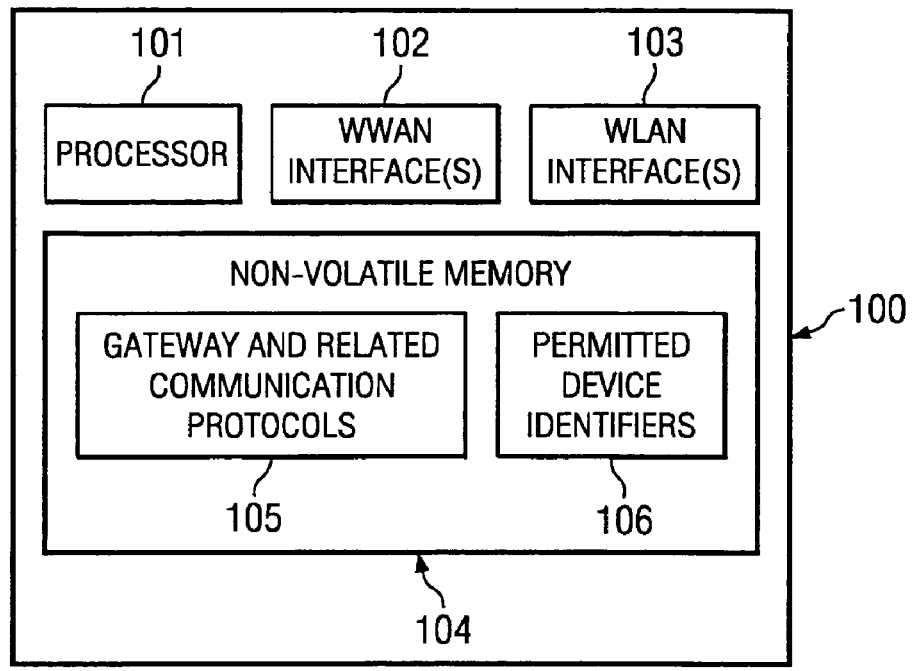
FIGS. 1A and 1B depict example portable computing devices according to representative embodiments.

Referring now to the drawings, FIG. 1A depicts portable computing device 100 according to representative embodiments. Portable computing device 100 includes processor 101, wireless wide area network (WWAN) interface(s) 102, and wireless local area network (WLAN) interface(s) 103. Suitable commercially available WWAN interfaces include, but are not limited to, GPRS interfaces, code division multiple access (CDMA) 1×RTT interfaces, CDMA 1×EVDO interfaces, 802.16 (WiMax) interfaces, wireless broadband interfaces, and the like. Suitable commercially available WLAN interfaces include, but are not limited to, 802.11b interfaces, 802.11a interfaces, 802.11g interfaces. For the purposes of the following description, the term WLAN is also used to refer to other communication mechanisms possessing limited communication ranges, e.g., personal area Bluetooth networks, personal area Ultra Wideband (UWB) networks, and/or the like.

Portable computing device 100 may be implemented in the form of a personal digital assistant (PDA), a notebook computer, or other portable computing platform. Suitable commercially available PDAs that comprise WWAN and WLAN interfaces include iPAQ™ Pocket PCs available from Hewlett-Packard Company, without implementation embodiments of the present invention such PDAs do not provide connectivity between the WWAN and WLAN interfaces. Alternatively, cellular telephones or other wireless devices that include appropriate processing capabilities and wireless interfaces may be used to implement representative embodiments.

Processor 101 operates under the control of executable instructions or code. The executable instructions or code may be stored in non-volatile memory 104 which is any suitable computer-readable medium. For example, gateway and related communication protocols 105 are stored in non-volatile memory 104. When portable computing device 100 is initially located within a cell or service area of a WWAN, portable computing device 100, under the control of protocols 105, attempts to establish a presence in the WWAN. The establishment of a presence within the WWAN may include detecting a digital control channel associated with the WWAN. The digital control channel enables portable computing device 100 to communicate with a base station associated with the cell or service area. By communicating with the base station, portable computing device 100 registers with routing services of the WWAN. For example, portable computing device 100 registers its location with a visiting location registry and/or a home location register to facilitate the routing of packets to portable computing device 100 according to the mobile Internet Protocol as an example. After registering its location within the WWAN, portable computing device 100 may communicate with various resources via the Internet using the GPRS functionality of the WWAN.

After portable computing device 100 establishes a presence within a WWAN, portable computing device 100, under the control of protocols 105, establishes a WLAN. In one embodiment, portable computing device 100 establishes itself as an "access point" according to the 802.11b standard. Portable computing device 100 may access a cache of permitted device identifiers 106 to limit access to the established WLAN. Furthermore, portable computing device 100 provides gateway functionality to other wireless communication devices within the established WLAN. Specifically, portable computing device 100 receives packets from the wireless communication devices in the WLAN and routes the packets to resources available via the Internet using the WWAN. Portable computing device 100 provides other communication functionality to facilitate the routing of packets such as network address translation (NAT), dynamic host configuration protocol (DHCP), firewall functionality, virtual private networking (VPN) functionality, content filtering functionality, and/or the like.

Figure 1B:
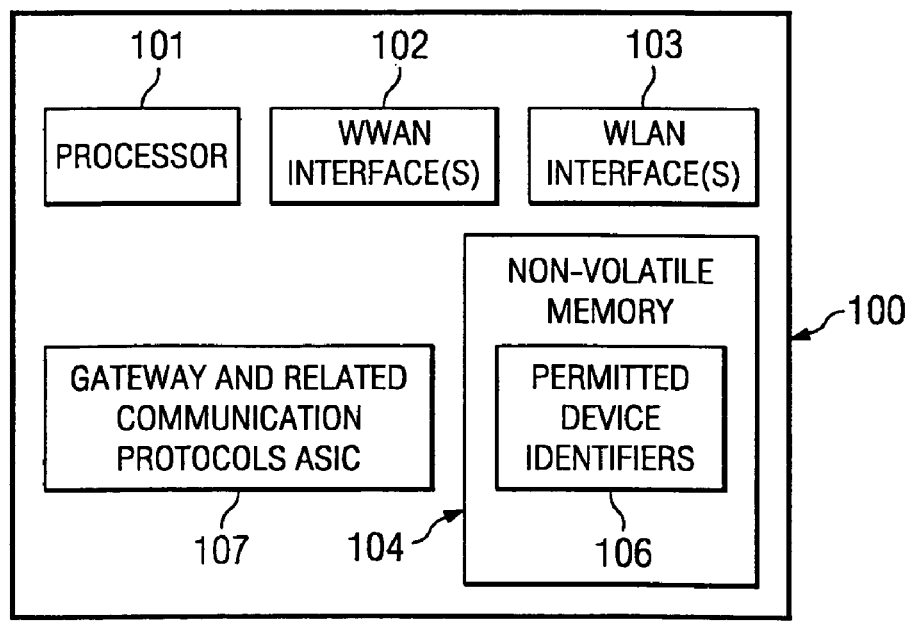

Although the functionality of protocols 105 has been described as being implemented using software instructions executed by processor 101, other embodiments may employ other implementations. For example, a suitable application specific integrated circuit (ASIC) or circuits (shown as ASIC 107 in FIG. 1B) may be used to implement protocols 105 according to one representative embodiment. Also, although embodiments are described as using a single WLAN network, protocols 105 may control multiple WLAN interfaces 102 simultaneously. For example, protocols 105 may establish a Bluetooth WLAN and a 802.11b WLAN operating in the same local area.

Figure 2:
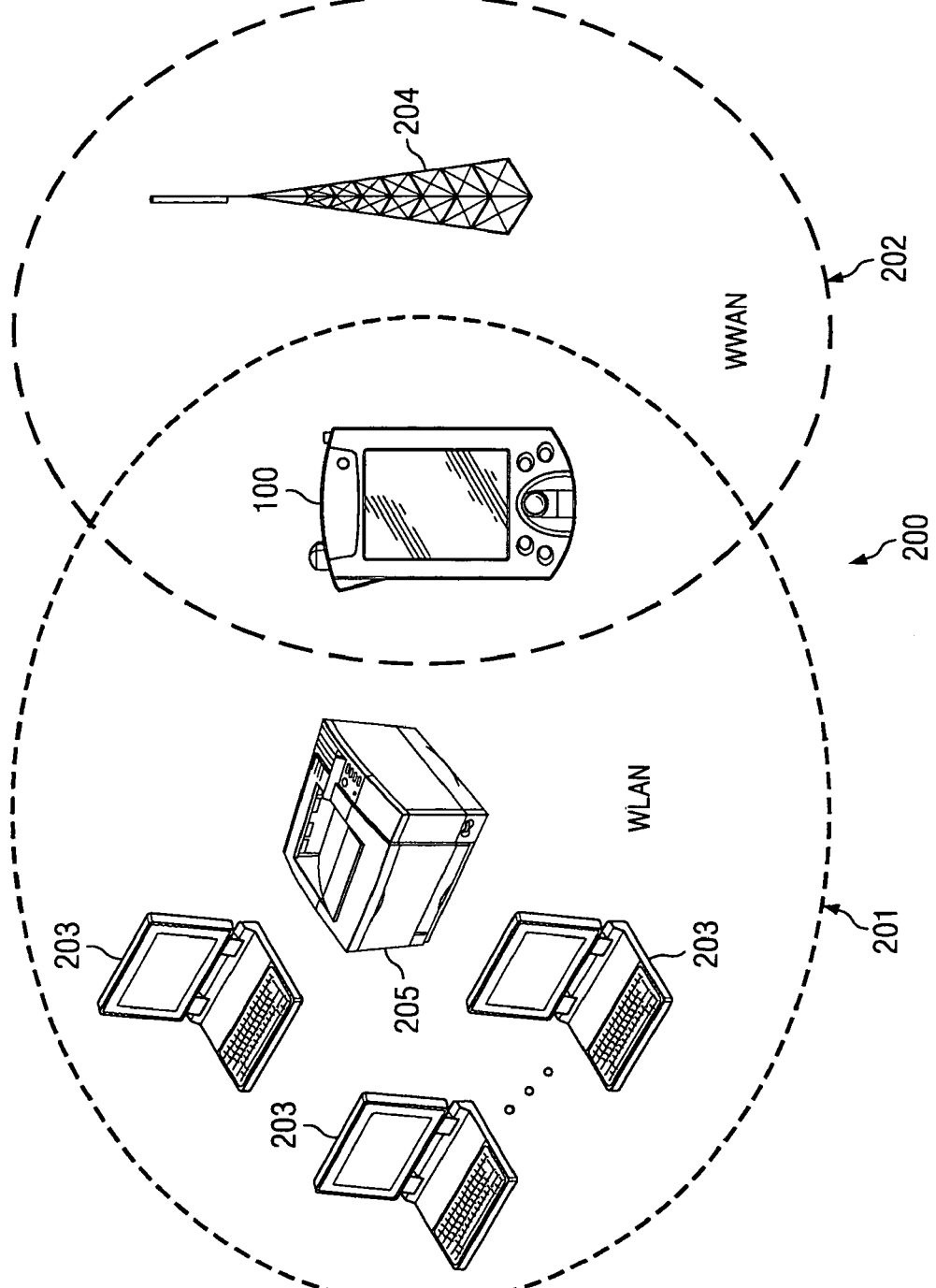
FIG. 2 depicts an example communication system according to one representative embodiment.

FIG. 2 depicts communication system 200 according to one representative embodiment. Communication system 200 comprises portable computing device 100. Portable computing device 100 is established within a cell or service area of WWAN 202. Portable computing device 100 communicates with resources on the Internet using WWAN infrastructure 204.

Portable computing device 100 acts as an access point for WLAN 201 to thereby provide an access point that is neither fixed in location (i.e., is portable) nor relies on wireline links for wide area communications. Furthermore, portable computing device 100 may authenticate or otherwise limit which devices may communicate within WLAN 201 to establish a private network. Wireless devices 203 within WLAN 201 may be implemented using a variety of computing devices such as desktop computers, laptop computers, personal digital assistants, and/or the like. Wireless devices 203 may include integrated WLAN interfaces or removable WLAN cards. Wireless devices 203 may communicate with resources available on the Internet by routing packets through portable computing device 1100. Wireless devices 203 may communicate with each other using the wireless management functionality of portable computing device 100. Alternatively, wireless devices 203 may communicate with shared resources (e.g., printer 205) using the wireless management functionality of portable computing device 100.

Figure 3:
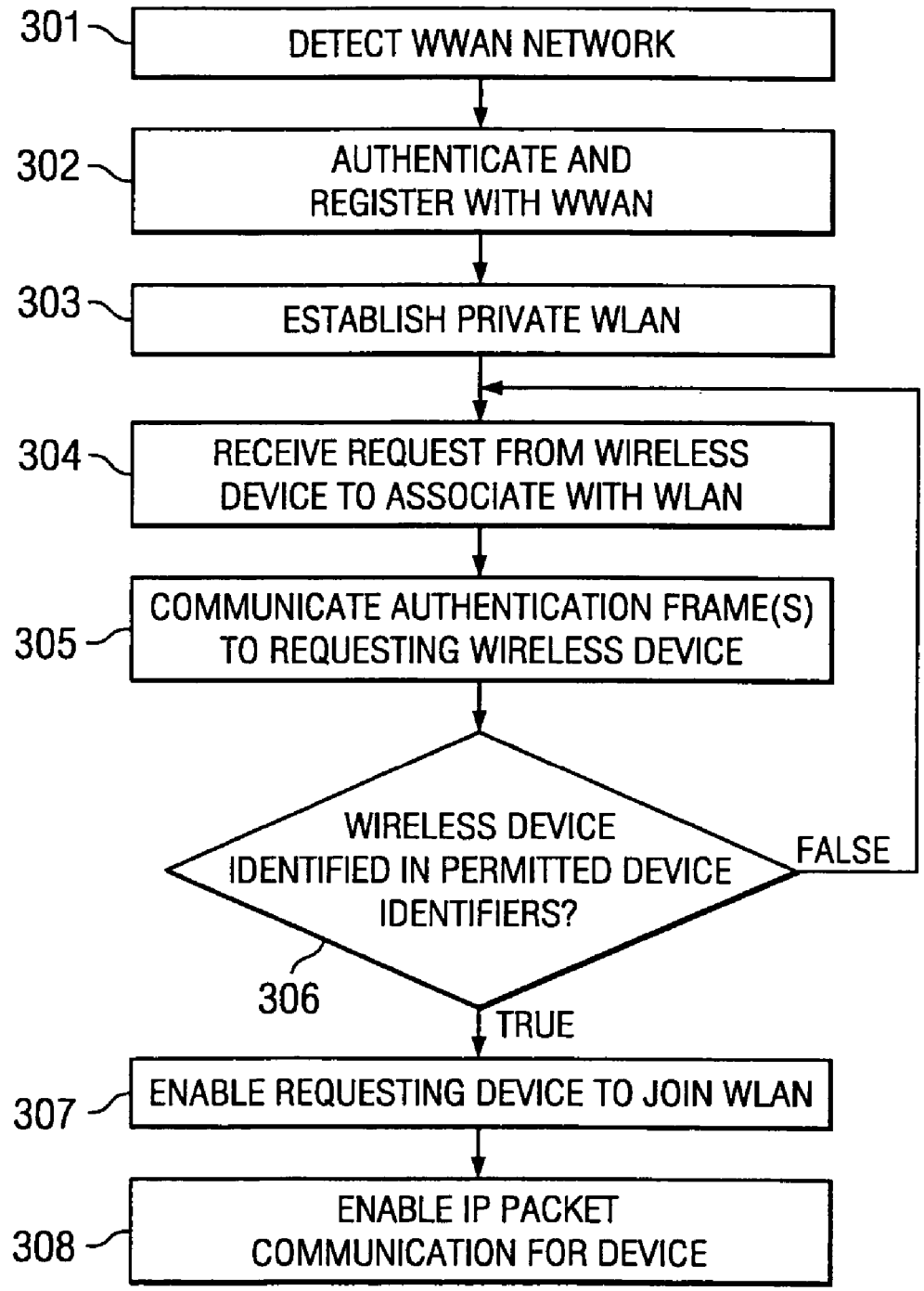
FIG. 3 depicts an example flowchart for managing wireless communications according to one representative embodiment.

FIG. 3 depicts a flowchart for managing wireless communications according to one representative embodiment by establishing a gateway protocol useful in facilitating WWAN connectivity with respect to a WLAN implementation. In block 301, a WWAN network is detected by mobile computing device 100. For example, mobile computing device 100 detects the digital control channel of a GSM cellular network or other network control channel. In block 302, mobile computing device 100 authenticates and registers with the WWAN network. The authentication may occur by communicating an electronic serial number, mobile serial number, challenge and response packets, and/or the like. After authentication and registration, mobile computing device 100 is established within the WWAN and is ready to communicate packets. Accordingly, the illustrated embodiment provides autonomous data interfacing with the WWAN when detected, or as otherwise desired by a user, thereby establishing a wireless presence on the WWAN.

In block 303, a private WLAN is established by mobile computing device 100. For example, mobile computing device 100 may begin broadcasting a beacon frame. In the 802.11b standard, the beacon frame enables wireless communication devices to locate and join a "basic services set" or (a set of devices communicating according to the wireless protocol). Additionally, mobile computing device 100 may respond to "probe request" frames according to the 802.11b standard. The probe request enables wireless communication devices to identify an access point associated with an infrastructure basic service set. Probe requests are employed to enable a wireless device to join an infrastructure basic services set in a more efficient manner, than waiting for the transmission of a beacon frame.

In block 304, a request, such as may include an identifier of a requesting wireless device, is received by mobile computing device 100 from a wireless device to join the WLAN. In block 305, at least one authentication frame is communicated between mobile computing device 100 and the requesting wireless device. In the 802.11b standard, authentication is performed using a multi-frame exchange using an authentication algorithm number, authentication transaction sequence number, a status code, and challenge text. In block 306, a logical determination is made to determine whether the requesting wireless device is identified within permitted device identifiers 106, such as by comparing an identifier of a requesting wireless device with identifiers stored in a memory of mobile computing device 100. If not, the wireless device is not allowed to join the WLAN and the process flow returns to block 304 to receive further requests. If the wireless device is identified within permitted device identifiers 106, the process flow proceeds to block 307 where the requesting wireless device is allowed to join the WLAN.

In block 308, Internet Protocol (IP) packet communication for the wireless device is enabled. For example, after joining the WLAN, the wireless device may broadcast a DHCP discovery packet. Procotols 105 of mobile computing device 100 may comprise a DHCP server that responds to broadcast discovery packets. Specifically, the DHCP server "leases" an IP address to the wireless device to enable packet communication. Using the assigned IP address, mobile computing device 100 routes packets to and from Internet resources for the wireless communication device and/or other devices of the WLAN using the WWAN, thereby providing gateway functionality such that mobile computing device 100 is established as an access point on said WLAN after a wireless presence on the WWAN is established. Mobile computing device 100 may perform other functionality such as network address translation, firewall filtering, virtual private networking, content filtering, and/or the like.

One or more of the foregoing functions may be performed in an order different than that set forth with respect to the embodiment of FIG. 3 described above. For example, one or more functions may be performed simultaneously, such as to provide a desired level of reliability and/or responsiveness, according to embodiments of the invention.

Representative embodiments may be used for a variety of applications. For example, portable computing device 100 may be used by groups of professionals that perform services in remote locations. For example, mobile accounting teams frequently set up temporary offices in facilities belonging to their clients. Mobile computing device 100 may be used by such teams to establish a local area network for the team members at client facilities. Moreover, mobile computing device 100 may be used by the teams to communicate with servers associated with the main office of the mobile teams. Representative embodiments offer a number of advantages in this type of situation. By employing representative embodiments, the local area network can be set up and removed in an efficient manner without employing wired technology. Additionally, every device belonging to the team members does not necessarily possess the hardware used for WWAN communication. By providing the WWAN functionality within a limited number of mobile computing devices 100, management of user accounts associated with the public wireless network may be managed in an efficient manner.

What is claimed is:

1. A portable computing device for wireless communications, comprising:
  a first network interface for communicating with a public wireless wide area network (WWAN);
  a second network interface for communicating with a private wireless local area network (WLAN); and
  a processor executing under control of software instructions, said software instructions defining a gateway protocol, said gateway protocol establishing said portable computing device as an access point within said private WLAN after a wireless presence on said public WWAN is established;
  wherein said gateway protocol is operable to receive requests from wireless devices to associate with said private WLAN, said gateway protocol is operable to authenticate said requesting wireless devices;
  wherein authentication of said requesting wireless devices comprises comparing an identifier of one of the requesting wireless devices with identifiers stored in non-volatile memory of said portable computing device; and
  wherein said first interface comprises a general packet radio service (GPRS) interface.

2. The portable computing device of claim 1 wherein said gateway protocol autonomously establishes said wireless presence on said public WWAN when said portable computing device is located within said public WWAN.

3. The portable computing device of claim 1 wherein said gateway protocol routes communication packets received from devices in said private WLAN through said public WWAN and routes communication packets received from said public WWAN to devices in said private WLAN.

4. The portable computing device of claim 1 wherein said second network interface comprises a network interface implementing the 802.11b communication standard.

5. A method for wireless communications, comprising:
  detecting entry into a service area of a public wireless wide area network (WWAN) by a portable computing device; and
  after detecting said entry, establishing a private wireless local area network (WLAN) by said portable computing device, wherein said portable computing device performs at least one access point service for said private WLAN;
  wherein said detecting entry comprises detecting a digital control channel associated with said service area.

6. The method of claim 5 further comprising:
  establishing a presence within said VVWAN by said portable computing device in response to said detecting entry.

7. The method of claim 5 further comprising:
  routing packet traffic, by said portable computing device, between said public WWAN and said private WLAN.

8. The method of claim 7 further comprising:
  leasing Internet protocol (IP) addresses to wireless devices in the private WLAN by said portable computing device to facilitate said routing packet traffic.

9. The method of claim 5 further comprising:
  authenticating, by said portable computing device, an identity of a wireless device requesting to associate with said private WLAN.

10. The method of claim 9 further comprising:
  comparing said authenticated identity of said requesting wireless device with identifiers stored in memory of said portable computing device.

11. A method for wireless communications, comprising:
  detecting entry into a service area of a public wireless wide area network (WWAN) by a portable computing device;
  after detecting said entry, establishing a private wireless local area network (WLAN) by said portable computing device, wherein said portable computing device performs at least one access point service for said private WLAN; and
  receiving dynamic host configuration protocol (DHCP) requests from wireless devices in said private WLAN by said portable computing device.

12. A method for wireless communications, comprising:
  detecting entry into a service area of a public wireless wide area network (WWAN) by a portable computing device; and
  after detecting said entry, establishing a private wireless local area network (WLAN) by said portable computing device, wherein said portable computing device performs at least one access point service for said private WLAN;
  wherein said establishing a private WLAN comprises broadcasting a beacon frame to enable association of wireless devices with said private WLAN.

13. A method for wireless communications, comprising:
  detecting entry into a service area of a public wireless wide area network (WWVAN) by a portable computing device; and
  after detecting said entry, establishing a private wireless local area network (WLAN) by said portable computing device, wherein said portable computing device performs at least one access point service for said private WLAN;
  wherein said establishing a private WLAN comprises responding to probe requests to identify said portable computing devices as an access point.

14. A system for wireless communications, comprising:
  means for registering with a public wireless wide area network (WWAN) to transmit and receive communication packets after detection of entry into a service area of said public WWAN; and
  means for establishing access point services for a private wireless local area network (WLAN), wherein said means for establishing operates in response to said means for registering;
  wherein said means for establishing comprises means for broadcasting a beacon frame to facilitate association of wireless devices with said private WLAN.

15. The system of claim 14 further comprising:
  means for routing communications packets between said private WLAN and said public WWAN.

16. The system of claim 14 further comprising:
  means for detecting entry into a service area of said WWAN.

17. The system of claim 14 wherein said means for establishing comprises:
  means for authenticating an identity of a wireless device that is requesting association with said WLAN.

18. The system of claim 14 further comprising:
  means for storing a plurality of identifiers of wireless devices permitted to communicate within said private WLAN.

19. The system of claim 14 further comprising:
  means for assigning Internet protocol (IP) addresses to wireless devices within said private WLAN.

20. The system of claim 14 wherein said means for registering, said means for establishing, and said means for routing are disposed in a mobile computing device.

* * * * *

UNITED STATES PATENT AND TRADEMARK OFFICE
CERTIFICATE OF CORRECTION

| | | |
|---|---|---|
| PATENT NO. | : 7,881,267 B2 | |
| APPLICATION NO. | : 10/861846 | |
| DATED | : February 1, 2011 | |
| INVENTOR(S) | : William C. Crosswy et al. | |

It is certified that error appears in the above-identified patent and that said Letters Patent is hereby corrected as shown below:

In column 6, line 25 (Approx.), in Claim 6, delete "VVWAN" and insert -- WWAN --, therefor.

In column 7, line 3, in Claim 13, delete "(WWVAN)" and insert -- (WWAN) --, therefor.

Signed and Sealed this

Twenty-sixth Day of April, 2011

David J. Kappos
*Director of the United States Patent and Trademark Office*